United States Patent Office 3,660,580
Patented May 2, 1972

---

3,660,580
USE OF CERTAIN OXIME ESTERS IN CONTROLLING FUNGI UPON CELLULOSIC MATERIALS
Don R. Baker, Pinole, Calif., assignor to Stauffer Chemical Company, New York, N.Y.
No Drawing. Continuation of application Ser. No. 649,023, June 26, 1967. This application Nov. 24, 1969, Ser. No. 873,727
Int. Cl. A61l *13/00*
U.S. Cl. 424—327    8 Claims

ABSTRACT OF THE DISCLOSURE

Method of inhibiting the growth of fungi upon cellulosic materials by applying thereto an effective amount of the compound having the formula

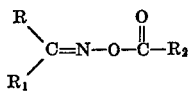

in which R and $R_1$ are independently selected from the group consisting of alkyl having from 1 to 4 carbon atoms, haloalkyl having from 1 to 4 carbon atoms, alkenyl having from 2 to 6 carbons, aryl and nuclear substituted derivatives thereof in which the substituents are selected from the group consisting of halogen, nitro and lower alkyl, $R_2$ is a radical selected from the group consisting of alkyl having from 1 to 10 carbon atoms; haloalkyl having from 1 to 10 carbon atoms; alkenyl having from 2 to 4 carbon atoms; and —$NHR_3$ in which $R_3$ is a radical selected from the group consisting of alkyl having from 1 to 10 carbon atoms; haloalkyl having from 1 to 10 carbon atoms; aryl and nuclear substituted derivatives thereof in which said substituents are selected from the group consisting of halogen, nitro and lower alkyl; alkenyl having from 2 to 6 carbon atoms; and

in which $R_4$ is a member selected from the group consisting of alkyl having from 1 to 12 carbon atoms and haloalkyl having from 1 to 4 carbon atoms.

---

This application is a continuation of application Ser. No. 649,023, filed June 26, 1967.

This invention relates to the use of certain novel keto oxime esters to inhibit the growth of fungi upon cellulosic material. The following subject matter is also contained in the copending application of Arnold D. Gutman, Ser. No. 649,024 filed June 26, 1967, now abandoned.

The compounds of the present invention are those having the formula

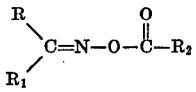

in which R and $R_1$ are independently selected from the group consisting of alkyl having from 1 to 4 carbon atoms, haloalkyl having from 1 to 4 carbon atoms, alkenyl having from 2 to 6 carbon atoms, aryl, preferably phenyl and nuclear substituted derivatives thereof in which the substituents are selected from the group consisting of halogen, nitro and lower alkyl, R and $R_1$ are most preferably both chloromethyl; $R_2$ is a radical selected from the group consisting of alkyl having from 1 to 10 carbon atoms; haloalkyl having from 1 to 10 carbon atoms, preferably chloroalkyl having from 1 to 4 carbon atoms; alkenyl having from 2 to 4 carbon atoms; —$NHR_3$ in which $R_3$ is a radical selected from the group consisting of alkyl having from 1 to 10 carbon atoms, preferably from 1 to 4 carbon atoms; haloalkyl having from 1 to 10 carbon atoms, preferably chloroalkyl having from 1 to 4 carbon atoms; aryl, preferably phenyl, and nuclear substituted derivatives thereof in which said substituents are selected from the group consisting of nitro, lower alkyl and halogen, preferably chloro, alkenyl, having from 2 to 6 carbon atoms, preferably from 2 to 4 carbon atoms; and a member having the formula

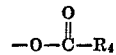

in which $R_4$ is a member selected from the group consisting of alkyl having from 1 to 12 carbon atoms and haloalkyl having from 1 to 4 carbon atoms, preferably chloroalkyl having from 1 to 4 carbon atoms.

The compounds of the present invention are phytotoxic and are particularly useful as herbicides especially in post-emergent control of weeds. The compounds are also useful in inhibiting the growth of bacteria and fungi and in inhibiting the growth of fungi upon cellulosic materials.

The compounds of the present invention can be prepared by reacting a compound of the formula

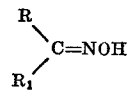

with a compound of the formula

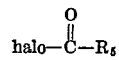

in which halo is chlorine or bromine and $R_5$ is a radical selected from the group consisting of alkyl or haloalkyl each having from 1 to 10 carbon atoms or alkenyl having from 2 to 4 carbon atoms; or a compound of the formula NCO—$R_3$ wherein $R_3$ is defined as above.

The above reaction yields compounds of the formula

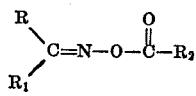

in which R, $R_1$ and $R_2$ are defined as above.

Preferably the reaction is carried out in the presence of a base such as pyridine and in a solvent for the reactants. Generally, the reaction is exothermic so no heating is required. Cooling is sometimes required to control the reaction rate. The compounds of this invention can be recovered from the mixture and purified by standard procedures.

Preparation of the compounds of this invention is illustrated by the following examples.

EXAMPLE 1

1,3-dichloroacetoneoximino N-allylcarbamate 63.5 gms. (0.50 mole) 1,3-dichloropropanone, 69.5 gms. (1.00 mole) hydroxylamine hydrochloride, 250 ml. ethanol and 25 ml. of water were combined and heated under reflux for four hours. The cooled mixture was poured into 500 ml. of water. The aqueous solution was extracted with 3–100 ml. portions of chloroform. The chloroform phases were combined and dried with anhydrous $MgSO_4$. The chloroform was evaporated to give 66.3 g. (93.6% of theory) of 1,3-dichloroacetoneoxime,

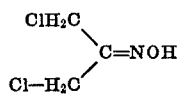

$N_D^{30}$=1.5044.

11.7 gms. (0.08 mole) of the 1,3-dichloroacetoneoxime and 6.7 gms. (0.08 mole) of allylisocyanate were combined in 100 ml. of benzene. After the exothermic reaction had subsided, the mixture was washed with 2–50 ml. portions of water. The benzene phase was dried with anhydrous MgSO₄ and evaporated to give 12.2 g. (72.8% of theory) of 1,3-dichloroacetoneoximino-N'-allylcarbamate

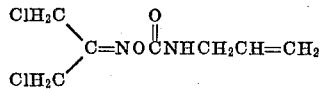

$N_D^{30}$= 1.5100.

EXAMPLE 2

1,3-dichloroacetoneoximecrotonate 10.0 gms. (0.07 mole) 1,3-dichloroacetoneoxime, 7.2 gms. (0.07 mole) crotonyl chloride were combined in 100 ml. of benzene. The mixture was stirred and cooled to 10° C. 6.3 gms. (0.08 mole) of pyridine was added over a period of 15 mins. The mixture was stirred at room temperature for 1 hour. An additional 100 ml. benzene was added, and the mixture was washed with 2–100 ml. portions of water. The benzene phase was dried with anhydrous MgSO₄ and evaporated to give 8.3 g. (55.8% of theory) of 1,3-dichloroacetoneoximinocrotonate

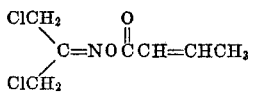

$N_D^{30}$=1.5090.

EXAMPLE 3

1,3-dichloroacetoneoxime-N'-methylcarbamate 14.2 gms. (0.1 mole) of 1,3-dichloroacetoneoxime was dissolved in 50 ml. chloroform and was cooled to 10° C. in an ice bath. 11.4 gms. (0.2 mole) of allylisocyanate was added at a temperature between 10° and 35° C. After the addition, the mixture was vacuum stripped. The resulting oil was dissolved in 150 ml. benzene and washed with two 100 ml. portions of water. The benzene phase was dried with anhydrous MgSO₄ and evaporated to give 13.7 grams (68.9% yield) of 1,3-dichloroacetoneoxime N'-methylcarbamate,

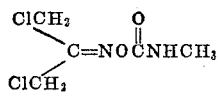

$N_D^{30}$=1.5062.

EXAMPLE 4

1,3-dichloroacetoneoxime-N' isopropyl carbamate 10.0 gms. (0.07 mole) of 1,3-dichloroacetone oxime, 6.0 gms. (0.07 mole) isopropyl isocyanate, 2 drops pyridine and 2 drops of dibutyl tin dilaurate were combined in a 500 ml. flask and refluxed for 1 hour. The reaction mixture was then vacuum stripped. 14.1 grams of 1,3-dichloroacetoneoxime-N' isopropyl carbamate

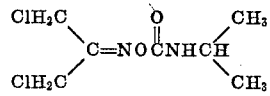

$N_D^{30}$=1.4930 was obtained.

EXAMPLE 5

1,3-dichloroacetoneoxime trichloroacetate 7.1 grams (0.05 mole) 1,3-dichloroacetoneoxime, 9.1 grams (0.05 mole) trichloroacetyl chloride and 100 ml. benzene were added to a 500 ml. flask, stirred and cooled to 10° C. with an ice bath. 4.7 grams (0.06 mole) pryidine was added at a rate sufficient to maintain the reaction temperature below 20° C. After the addition of the pyridine, the ice bath was removed, and the mixture was stirred at room temperature for 1 hour. An additional 100 ml. benzene was added, and the mixture was washed with 50 ml. dilute HCl followed by two 100 ml. water washes. The benzene phase was dried with MgSO₄ and evaporated to give 10.4 grams 1,3-dichloroacetoneoxime trichloroacetate

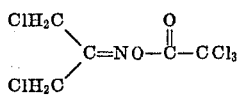

$N_D^{30}$=1.5078.

EXAMPLE 6

1,3-dichloroacetoneoxime-N'-(4-chlorophenyl) carbamate 7.1 grams (0.05 mole) 1,3-dichloroacetoneoxime, 7.7 grams (0.05 mole) 4-chlorophenyl isocyanate, and 50 ml. acetone were combined in a 250 ml. flask. The resulting mixture was stirred at room temperature for 1 hour, poured into 200 ml. benzene, and washed with two 100 ml. portions of water. The benzene phase was then dried with MgSO₄ and evaporated to yield 13.5 grams of 1,3-dichloroacetone oxime-N-(4-chlorophenyl) carbamate.

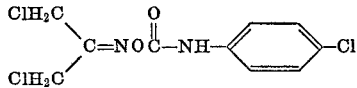

EXAMPLE 7

1,3-dichloroacetoneoxime-N'-(4-nitrophenyl) carbamate

The same procedure as stated in Example 6 was followed. 7.1 (0.05 mole) 1,3-dichloroacetoneoxime, 8.2 g. (0.05 mole) 4-nitrophenyl isocyanate with 4 drops of pyridine were reacted in 50 ml. acetone. 15 grams of 1,3-dichloroacetoneoxime-N'-(4-nitrophenyl) carbamate

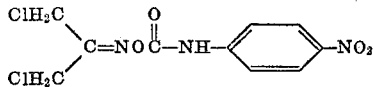

$n_D^{30}$=1.5995 was obtained.

EXAMPLE 8

1,3-dichloroacetoneoxime-N'-octyl carbamate

The reaction procedure of Example 7 was repeated except that n-octyl isocyanate (0.05 mole) was substituted for the 4-nitrophenyl isocyanate. 14.0 grams of 1,3-dichloroacetoneoxime-N'-octyl carbamate

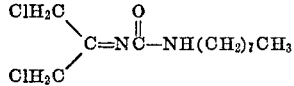

$n_D^{30}$=1.4860 was obtained.

EXAMPLE 9

1,2-dichloracetoneoxime chloroacetate 14.2 grams, (0.10 mole) 1,3-dichloroacetoneoxime, 12.5 grams (0.11 mole) pyridine in 150 ml. benzene were reacted according to the procedure of Example 5. The resulting product 1,3-dichloroacetoneoxime chloroacetate.

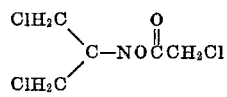

was recovered in the manner of Example 5 in a yield of 14.0 grams. The M.P. of the product was found to be 70–73° C.

EXAMPLE 10

1,1-dichloroacetophenoneoxime-N'-methyl carbamate 1,1-dichloroacetophenone and hydroxylamine hydrochloride were reacted to prepare 1,1-dichloroacetophenoneoxime in the manner described in Example 1 for the preparation of 1,3-dichloroacetoneoxime.

9.4 grams (0.04 mole) 1,1-dichloroacetophenoneoxime and 5.0 grams (0.10 mole) methylisocyanate were combined in 25 ml. acetone. The product was isolated in the manner described for the preparation of 1,3-dichloroacetoneoxime N'-allylcarbamate in Example 1, to give at 95.5 percent yield of 1,1-dichloroacetophenone-oxime-N'-methyl carbamate,

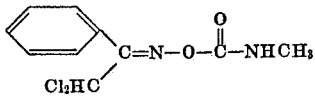

$n_D^{30} = 1.5660.$ (d) mestyloxime-N'-methylcarbamate

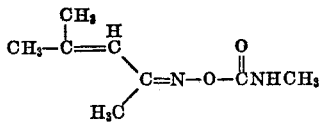

$n_D^{30} = 1.4950.$

The following is a table of certain selected compounds that have been prepared according to the procedure described hereto. Compound numbers have been assigned to each compound and are used throughout the remainder of the application.

TABLE I $$\begin{array}{c} R \\ \diagdown \\ \diagup \\ R_1 \end{array} C=NO\overset{O}{\underset{\|}{C}}-R_2$$

| Compound No. | R | $R_1$ | $R_2$ |
|---|---|---|---|
| 1 | Chloromethyl | Chloromethyl | —NH-methyl. |
| 2 | do | do | —NH-allyl. |
| 3 | do | do | —NH-isopropyl. |
| 4 | do | do | —NH-3,4-dichlorophenyl. |
| 5 | do | do | —NH-n-butyl. |
| 6 | do | do | Trichloromethyl. |
| 7 | do | do | 1-propenyl. |
| 8 | do | do | —NH-4-chlorophenyl. |
| 9 | do | do | —NH-4-nitrophenyl. |
| 10 | do | do | Vinyl. |
| 11 | do | do | —NH-n-octyl. |
| 12 | do | do | —NH—O—$\overset{O}{\underset{\|}{C}}$—CH—Cl |
| 13 | Phenyl | Dichloromethyl | —NH-methyl. |
| 14 | 4-bromophenyl | Bromomethyl | Do. |
| 15 | 4-nitrophenyl | do | Do. |
| 16 | 3-nitrophenyl | Methyl | Do. |
| 17 | 2,2-dimethylvinyl | do | Do. |

EXAMPLE 11

In a series of experiments 1,4'-dibromo-acetophenone, 1-bromo, 4'-nitro-acetophenone, 3'-nitro-acetophenone, and mestyl oxide, were each reacted with hydroxylamine hydrochloride to produce: 1,4'-dibromoacetophenoneoxime; 1-bromo, 4'-nitroacetophenoneoxime; 3'-nitroacetophenoneoxime; and mestyloxime; respectively, in the manner described in Example 1 for the preparation of 1,1-dichloroacetoneoxime. These oximes were reacted with methyl-isocyanate, and the product was isolated in the manner described in Example 1 for the preparation of 1,1-dichloroacetoneoxime N'-allylcarbamate to yield, respectively, the following:

(a) 1,4'-dibromoacetophenone oxime-N'-methyl carbamate

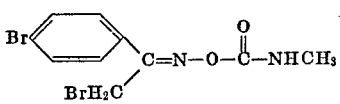

M.P. 139–143° C.

(b) 1-bromo, 4'-nitroacetophenoneoxime-N'-methylcarbamate

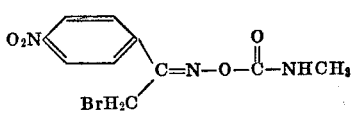

M.P. 146–148° C.

(c) 3'-nitroacetophenoneoxime-N'-methylcarbamate

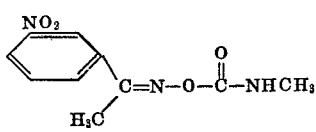

M.P. 168–169° C.

In vitro vial test: This test measures the bactericidal and fungicidal properties of a compound when in contact with a growing bacterium or fungus. The test is conducted by partially filling two 1-ounce vials with malt broth and one 1-ounce vial with nutrient broth. Next the test compound is added to the vials at a certain concentration, expressed in parts per million, and mixed with the broth. A water suspension of spores of the desired fungi or cells of the desired bacteria (one organism per vial) is added. The vials are then sealed and incubated for one week; at this time the vials are examined and the results recorded. Table II shows the results of various compounds tested by the in vitro vial test.

TABLE II

Concentration (p.p.m.) which inhibited growth

| | Fungus | | Bacteria | |
|---|---|---|---|---|
| Compound | Aspergillus niger | Penicillium sp. | Escherichia coli | Staphylococcus aureus |
| 1 | 10 | >50 | >50 | 25 |
| 2 | 10 | >50 | >50 | 50 |
| 3 | (25) | (25) | >50 | 25 |
| 4 | (50) | (10) | >50 | >50 |
| 5 | (10) | (25) | >50 | 25 |
| 6 | >50 | (50) | >50 | 25 |
| 7 | (0.25) | 0.5 | (50) | 10 |
| 8 | 25 | (25) | >50 | >50 |
| 9 | 25 | 25 | >50 | 50 |
| 10 | 0.25 | (0.25) | 25 | 10 |
| 11 | 25 | 50 | >50 | 50 |
| 14 | (25) | 25 | >50 | >50 |
| 17 | 50 | 50 | 50 | 50 |

As can be seen by the test results the compounds of the present invention find particular utility as bactericides and fungicides. The compounds can be applied in a variety of ways at various concentrations. They can be combined with suitable carriers and applied as dusts, sprays or drenches. The amount applied will depend on the nature of the utility. The rate of application can also vary with the microbiological use intended.

The following portion of the specification discloses subject matter not found in said copending application of Arnold D. Gutman.

The compounds of the present invention have utility in preventing fungus growth upon cellulosic material. This property is illustrated by the following test.

Rinse test: This test was conducted by dissolving a compound in acetone at a concentration of 0.1 percent by weight to prepare a stock solution. The next 0.1, 0.2, 0.4 and 0.8 ml. portions of the stock solution were diluted in 100 ml. solution with cold tap water 10 grams pieces of a white washed cotton cloth were then placed in each of the 100 ml. solutions and stirred for five minutes. The pieces of cloth were then removed, hand wrung and air dried. The chemically treated cloth samples were next insulated with 2 ml. of potato dextrose broth containing spores of *Aspergillus niger*. The pieces of cloth were then placed in petri dishes and stored at 95% relative humidity for one week at 30° C. After this one week period, the pieces of cloth were examined for fungi growth. The compounds of this invention gave excellent control in preventing growth of the fungi upon the cellulosic material. For example, compound No. 7 controls fungi growth on all the cloth samples except at the lowest concentration.

I claim:

1. The method of inhibiting the growth of fungi upon cellulosic materials which comprises applying thereto an effective amount of a compound having the formula

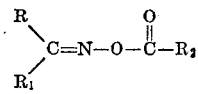

in which R and $R_1$ are chloromethyl, $R_2$ is (1) alkenyl having from 2 to 4 carbon atoms, or (2) —$NHR_3$ in which $R_3$ is alkyl having from 1 to 10 carbon atoms, nitrophenyl, chlorophenyl, or alkenyl having from 2 to 6 carbon atoms.

2. The method as stated in claim 1 in which $R_2$ is a —$NHR_3$ radical in which $R_3$ is an alkyl group of 1 to 10 carbon atoms.

3. The method as stated in claim 2 in which $R_3$ is methyl.

4. The method as stated in claim 1 in which $R_2$ is a —$NHR_3$ radical in which $R_3$ is an alkenyl group having from 2 to 6 carbon atoms.

5. The method as stated in claim 4 wherein $R_3$ is allyl.

6. The method as stated in claim 1 in which $R_2$ is an alkenyl group having from 2 to 4 carbon atoms.

7. The method as stated in claim 6 wherein $R_2$ is 1-propenyl.

8. The method as stated in claim 6 wherein $R_2$ is vinyl.

References Cited
UNITED STATES PATENTS
2,880,238  3/1959  Kundiger et al. _____ 424—327

SAM ROSEN, Primary Examiner